(12) United States Patent
Boisselle et al.

(10) Patent No.: US 8,713,973 B2
(45) Date of Patent: May 6, 2014

(54) GLASS TEMPERING METHOD AND APPARATUS

(75) Inventors: Robert J. Boisselle, Maumee, OH (US); John Tomik, Lasalle, MI (US)

(73) Assignee: Pilkington Group Limited, St. Helens (GB)

( * ) Notice: Subject to any disclaimer, the term of this patent is extended or adjusted under 35 U.S.C. 154(b) by 48 days.

(21) Appl. No.: 13/261,066

(22) PCT Filed: Jun. 8, 2010

(86) PCT No.: PCT/US2010/001645
§ 371 (c)(1),
(2), (4) Date: Dec. 8, 2011

(87) PCT Pub. No.: WO2010/147624
PCT Pub. Date: Dec. 23, 2010

(65) Prior Publication Data
US 2012/0073327 A1    Mar. 29, 2012

Related U.S. Application Data

(60) Provisional application No. 61/186,918, filed on Jun. 15, 2009.

(51) Int. Cl.
*C03B 27/048* (2006.01)
*C03B 27/04* (2006.01)
*C03B 27/044* (2006.01)

(52) U.S. Cl.
CPC ......... *C03B 27/0404* (2013.01); *C03B 27/0417* (2013.01); *C03B 27/0442* (2013.01)
USPC ........................................................... 65/348

(58) Field of Classification Search
CPC ............ C03B 27/0404; C03B 27/0417; C03B 27/044; C03B 27/0442
USPC ............................................. 65/115, 243, 348
See application file for complete search history.

(56) References Cited

U.S. PATENT DOCUMENTS

| | | | |
|---|---|---|---|
| 4,314,836 A | 2/1982 | Seymour | |
| 4,323,385 A | 4/1982 | Gintert et al. | |
| 4,343,645 A | 8/1982 | Abe | |
| 4,508,783 A | 4/1985 | Aubry et al. | |
| 4,773,926 A | 9/1988 | Letemps et al. | |
| 6,412,309 B1 | 7/2002 | Kajii et al. | |
| 2006/0121281 A1 | 6/2006 | Tamai et al. | |
| 2007/0122580 A1* | 5/2007 | Krall et al. | 428/38 |
| 2009/0173106 A1* | 7/2009 | Boisselle | 65/115 |

FOREIGN PATENT DOCUMENTS

GB    1 157 391 A    7/1969
WO    WO 03101898 A1 *  12/2003

* cited by examiner

*Primary Examiner* — Matthew Daniels
*Assistant Examiner* — Cynthia Szewczyk
(74) *Attorney, Agent, or Firm* — Marshall & Melhorn, LLC

(57) ABSTRACT

The present invention relates to glass tempering modules of a glass tempering apparatus capable of selectively directing a tempering medium at increased velocity in designated areas of a shaped glass sheet, by the selective arrangement and utilization of quench nozzles in the glass tempering modules, at varying distances from the surface of the shaped glass sheet. A method of tempering a glass sheet utilizing the foregoing apparatus is also provided.

9 Claims, 8 Drawing Sheets

GLASS TEMPERING METHOD AND APPARATUS

RELATED APPLICATIONS

This application, which is a national phase filing under 35 USC 371 of PCT international application No. PCT/US2010/001645 filed Jun. 8, 2010, pending as of the filing of the present application, claims the benefit of and priority to provisional application No. 61/186,918 filed Jun. 15, 2009, the contents of which are hereby incorporated by reference.

BACKGROUND

The present invention relates to an improved apparatus for tempering glass sheets and a method of tempering utilizing that apparatus.

Many methods of treating glass to cause it to break in small, harmless pieces, rather than large, elongated shards which can cause serious injury, have been practiced. The goal of early tempering methods to treat relatively small sheets of glass was to uniformly distribute the airflow over the entirety of the surface of the glass sheet. As single glass sheets used, for example, in vehicles became larger, and the analysis of stresses in glass became more sophisticated, methods of differentially treating areas of a glass sheet were devised. One particularly intractable problem has been the elimination of inadequately tempered areas, relatively near the center of large sheets of glass such as automotive backlights.

Thus, those skilled in the art of glass tempering have continued to search for a way to improve tempering, on a consistent basis, during time-critical automotive glass manufacturing operations.

As noted, glass tempering or heat treatment is the subject of many patents, for example:

U.S. Pat. No. 4,314,836 describes a construction and arrangement of a tempering medium supply system that is said to provide relatively wide escape paths in the direction of the glass sheet thickness for blasts of tempering medium applied toward the central portion of the glass sheet compared to the escape paths provided in said direction for blasts of tempering medium applied to the portion of the glass sheet beyond the central portion. The resulting tempered glass sheets utilizing the process of the present invention are said to produce fragments meeting code requirements in the central portion as well as the portion beyond the central portion when subjected to destructive testing.

U.S. Pat. No. 4,323,385 describes a process for uniformly tempering the entirety of a glass sheet utilizing plenum chambers having aperture walls facing the opposite major surfaces of the glass sheet, wherein the apertures are constructed and arranged to be smaller and more closely spaced in the portion of the plenum that faces the central portion of the glass sheet during tempering than the apertures provided in the wall outside the central portion. Nozzles extending from said apertures are constructed and arranged so that nozzles extending from the relatively small diameter, more closely spaced apertures of the central portion of the wall are longer, and narrower and have their ends closer to the major surface of the glass sheet than the relatively widely spaced nozzles of relatively larger cross-section that extend from the remaining apertures in the aperture wall.

U.S. Pat. No. 4,508,783 describes a method of differentiated rate of hardening of a glass sheet by blowing a cooling gas in the direction of the sheet having two zones, from nozzles. According to the invention, a simultaneous solidification of the glass sheet is said to be produced at both zones of the sheet in spite of the differentiated treatments applied to establish a difference of hardening between the different zones of the sheet.

U.S. Pat. No. 4,773,926 describes a tempering process for glass sheets of ±2mm in thickness in which process, a plurality of nozzles from which a gas flow emanates, are located so that their free ends are directed toward the glass sheet in a position spaced slightly apart from the glass surface. Each nozzle is pierced by a narrow, calibrated orifice and the feed pressure of each nozzle is maintained for purposes of blowing the gas, generally air, at least at sonic speed toward the surface of the sheet. The configuration of the nozzles are said to ensure that the speed of the blowing gas is, at least, at sonic speed at the surface of the glass sheet, thus optimizing coating power. One measure to increase the evacuation of the blown air is said to be accomplished by the use of nozzles having longer tubular bodies extending toward the free end. The nozzles may be longer in relation to the width of the tempering station. Additionally, or alternatively, the flow of blown air may be increased in volume per unit surface area.

U.S. Pat. No. 6,412,309 describes a glass quenching apparatus including a first nozzle group for jetting blower air onto opposite surfaces of the glass sheet, the first nozzle group being stationary nozzles, and a second nozzle group being movable nozzles for jetting compressor air onto at least one of the opposite surfaces of the glass sheet, which nozzles are capable of moving parallel to a plane of the glass sheet. The movable nozzle group can be located, it is said, at an optimum position with respect to, for example, a hard-to-cool portion of a glass sheet.

SUMMARY OF THE INVENTION

The present invention relates to a glass tempering apparatus comprised of at least one and preferably of two glass tempering modules, at least one such glass tempering module being capable of selectively delivering specified volumes of a tempering medium at increased velocity to designated areas of a moving glass sheet to create desired stress differentials in such designated areas, by the selective arrangement and utilization of quench nozzles at different distances from the surface of the glass sheet to be tempered. In particular, nozzles arranged in rows parallel to the direction of travel of the glass sheet, spanning a specified distance on either side of the centerline of the glass tempering apparatus, certain selected nozzles being at a reduced distance from the surface of the glass sheet to be tempered delivering tempering medium at an increased velocity, have been found to substantially reduce the incidence of inadequate tempering of, in particular, large sheets of glass.

A method of improved tempering utilizing the apparatus of the present invention is also provided.

DETAILED DESCRIPTION OF THE INVENTION

The present invention relates to a glass tempering apparatus 10 and to a method of tempering glass sheets utilizing such apparatus. More specifically, the invention relates to an apparatus 10 for, and method of selectively delivering desired volumes of tempering medium at increased velocity to one or more areas of at least one major surface of a glass sheet 12. The glass sheet 12 is, for example, adapted for use as a vehicle window. In particular, the apparatus 10 of the present invention allows for significant improvement in tempering of large glass sheets 10, such as vehicle backlights, by directing specified volumes of tempering medium, at increased velocity, toward specified areas of the glass sheet 10 where glass quality testing has shown that tempering may have been insufficient. To remedy this situation, applicants utilized the well known principle that tempering is creating stresses in the amorphous glass structure, and that areas where compressive stresses predominate make the glass stronger than in areas where tensile stresses predominate. While not wishing to be bound by any theory, applicants believe that the apparatus of the present invention reduces the undesirable occurrence of splines by as much as 90%, due to the creation of a number of areas of increased stress differentials. More particularly, the inventors have found that use of quench nozzles selectively closer to the surface of the glass sheet to be tempered create stress differentials of 10 mPa or greater, which has been found to be beneficial in reducing spline length in selected areas.

Figure 2:
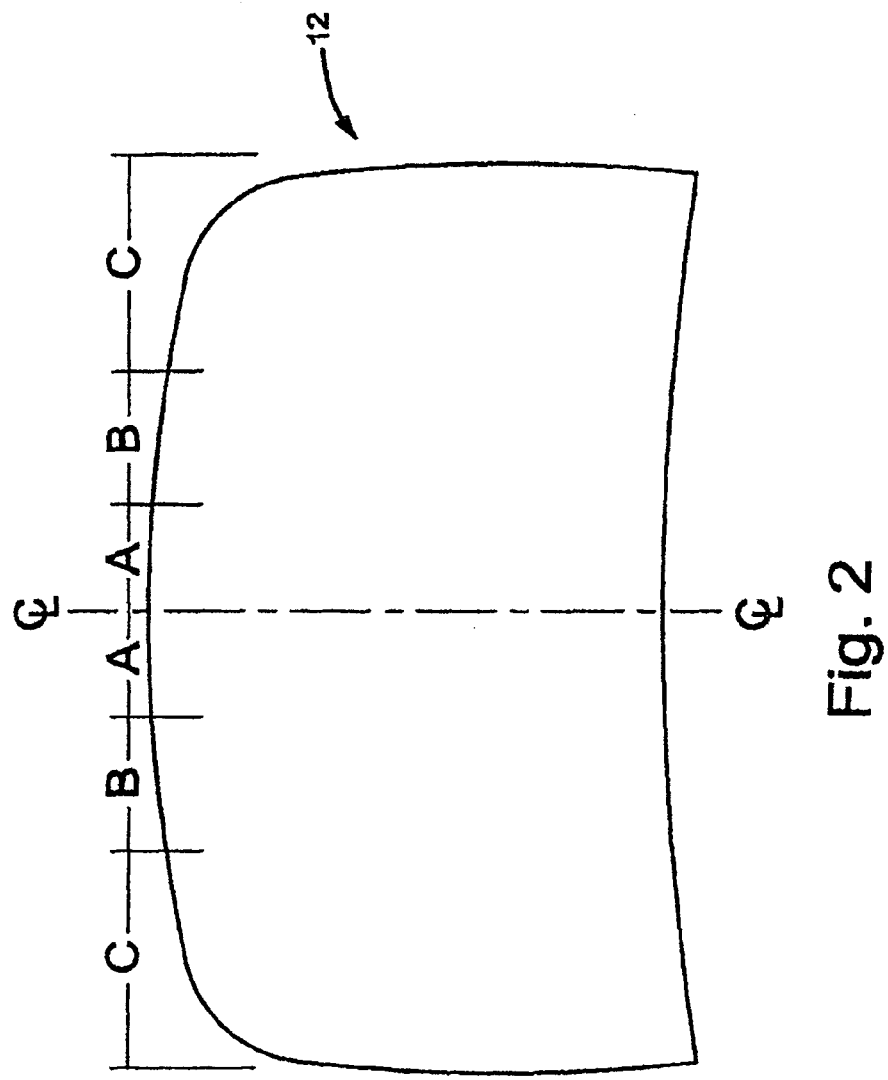
FIG. 2 is a plan view of a representative glass sheet showing areas prone to insufficient tempering.

As shown in FIG. 2, in large glass sheets 12, the area found to be most prone to insufficient tempering resulting in deviations from acceptable tempering break patterns, i.e., break patterns of elongated glass shards known as "splines", rather than small, rounded particles, occurs a relatively consistent distance (distance "A") transversely from, and on either side of, the centerline of the glass tempering apparatus. The width of the area in which the splines typically occur tends also to be relatively consistent, and is sometimes referred to herein as distance "B". The distance from the outer edge of distance "B" to the outermost edge of the glass sheet, transversely from its centerline, is sometimes referred to herein as distance "C". Tempering apparatus such as the present invention are sometimes referred to as "blastheads", "quench modules" or "quench boxes."

Figure 1:
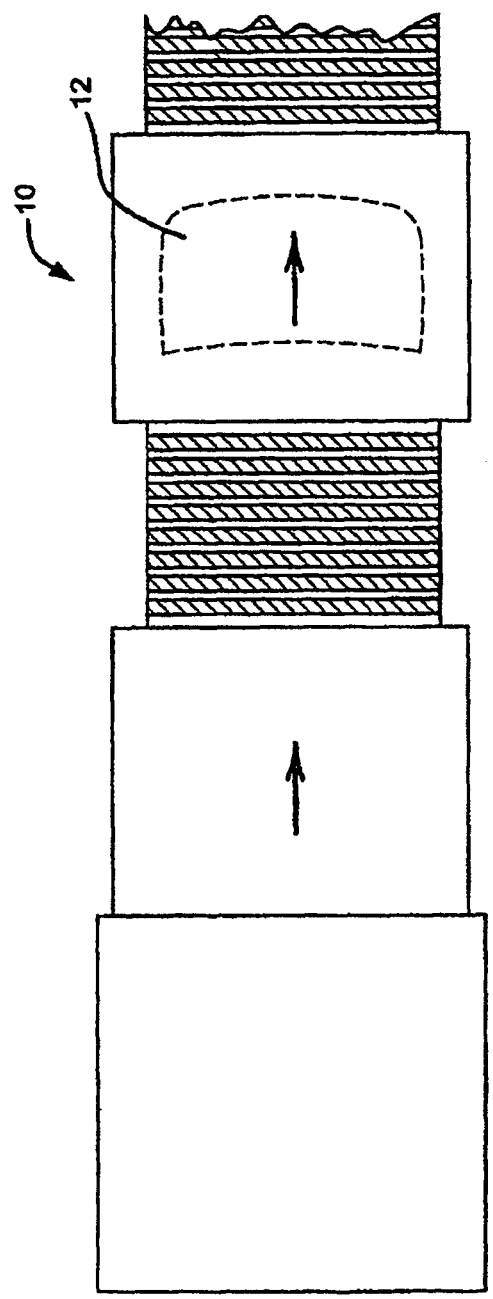
FIG. 1 is a plan view of a glass tempering line in accordance with the invention.
Figure 3:
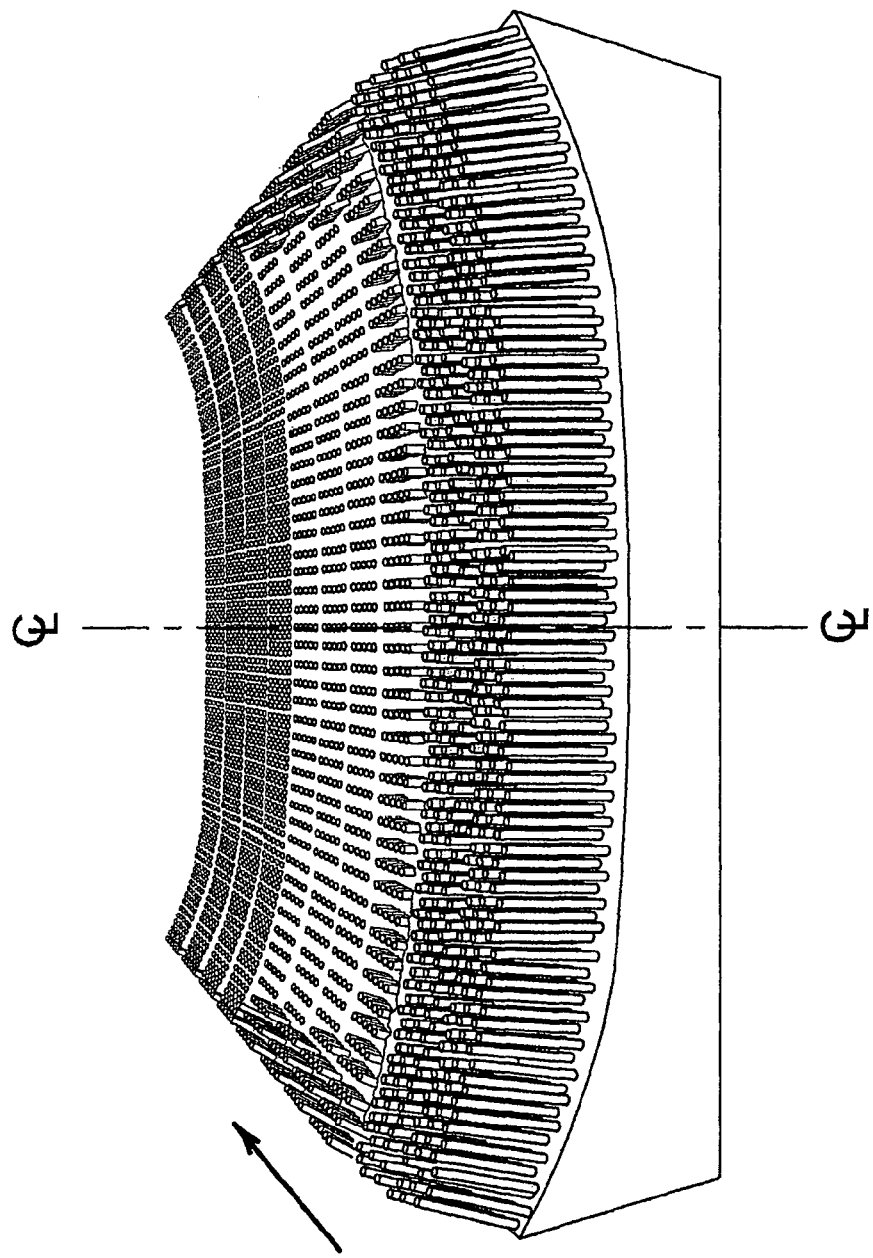
FIG. 3 is a perspective view of a conventional blasthead assembly.
Figure 4:
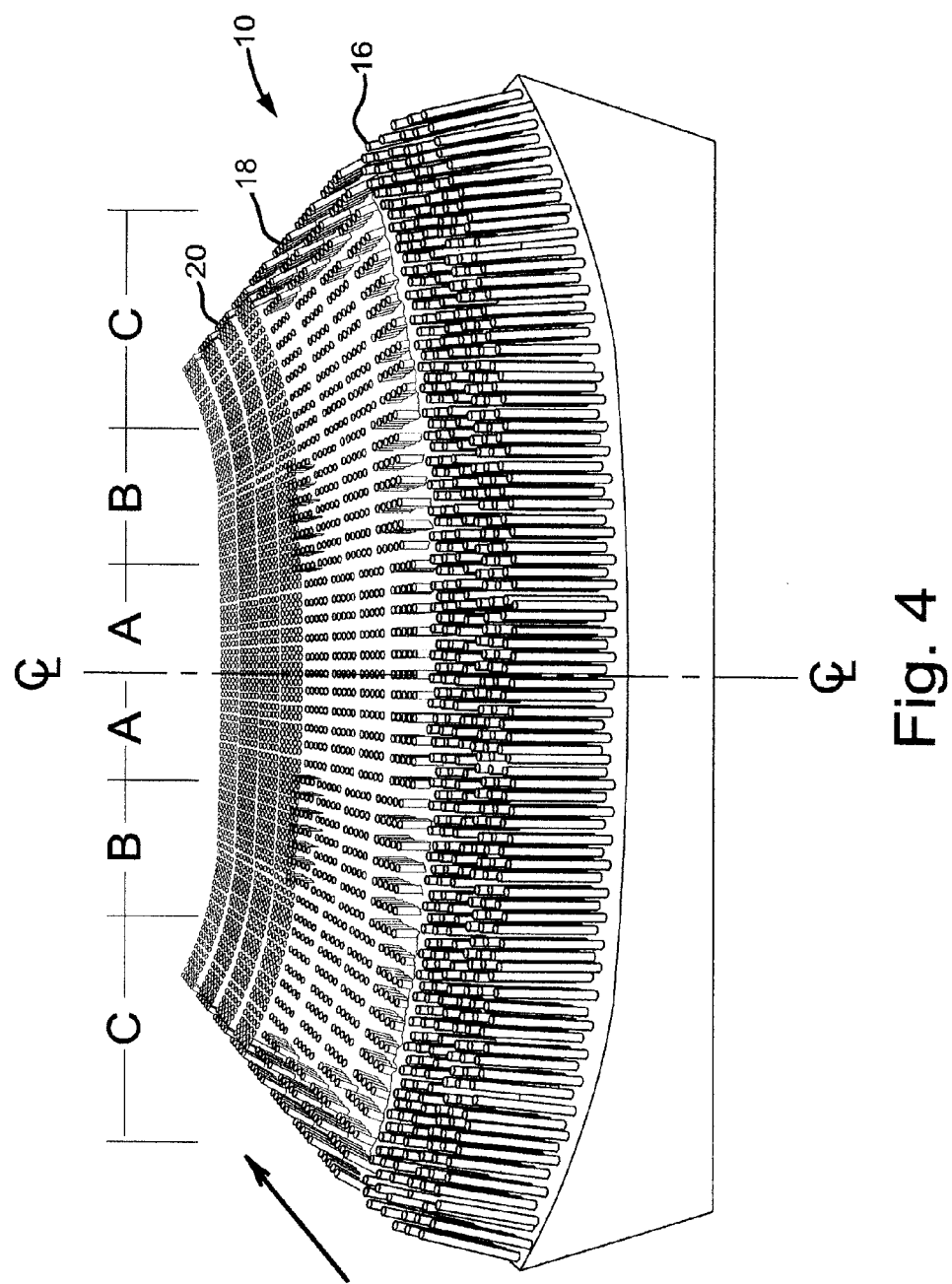
FIG. 4 is a perspective view of a blasthead assembly with variable length nozzles in accordance with the invention.

It is an advantage of the present invention that the tempering apparatus 10 can be used as a component of a typical glass tempering line 14, shown schematically in FIG. 1. A conventional blasthead assembly is shown in FIG. 3. As can be seen, the quench nozzles are configured to follow the contour of the shaped glass sheet. As such, the distal ends of the quench nozzles remain substantially a uniform distance from the surface of the shaped glass sheet. A tempering apparatus 10 in accordance with the present invention is shown in FIG. 4. As will be explained in greater detail, it is an objective of the present invention to position the distal ends of selected quench nozzles closer to the glass surface, in order to increase the velocity of the tempering medium from those selected nozzles, which contacts the surface of the shaped glass sheet.

Still with reference to FIG. 4, and in the direction denoted therein as the direction of glass travel, there is illustrated a plurality of nozzles from which tempering medium, preferably air, is emitted and directed toward a major surface of the glass sheet.

In the direction of travel of the glass sheet 12, in accordance with the invention, the glass sheet 12 first encounters a first zone having a first plurality of nozzles 16, preferably arranged in staggered rows, sometimes known as a "domino five" pattern, although other nozzle patterns are within the scope of the invention. The moving glass sheet 12 then encounters a second zone having a second plurality of nozzles 18 arranged in parallel rows, sometimes known as a "striper" or a modified striper. As can be seen, the length of the nozzles varies in an area on either side transversely of the centerline of the apparatus. Distances "A", "B" and "C" as designated on the glass sheet 12 of FIG. 2 are superimposed on the corresponding area of the tempering apparatus 10, according to the embodiment of the present invention illustrated in FIG. 4. Finally, in its route of travel past the tempering apparatus, the glass sheet 12 encounters a third zone having a third plurality of nozzles 20 in staggered rows, such as the domino five, or modified domino five pattern.

The length of the nozzles in the first, second and third pluralities of nozzles 16, 18, 20 are predetermined to substantially conform to the shape of the glass sheet 12 to be tempered.

Still referring to FIG. 4, in the modified striper portion 18 of the tempering apparatus 10, and in a direction transverse to the direction of glass travel, the modified striper, according to the present invention, can be described as parallel rows of nozzles from which cooling air typically at a temperature of from 50° F. to 150° F. is emitted toward the glass sheet 10.

Figure 5:
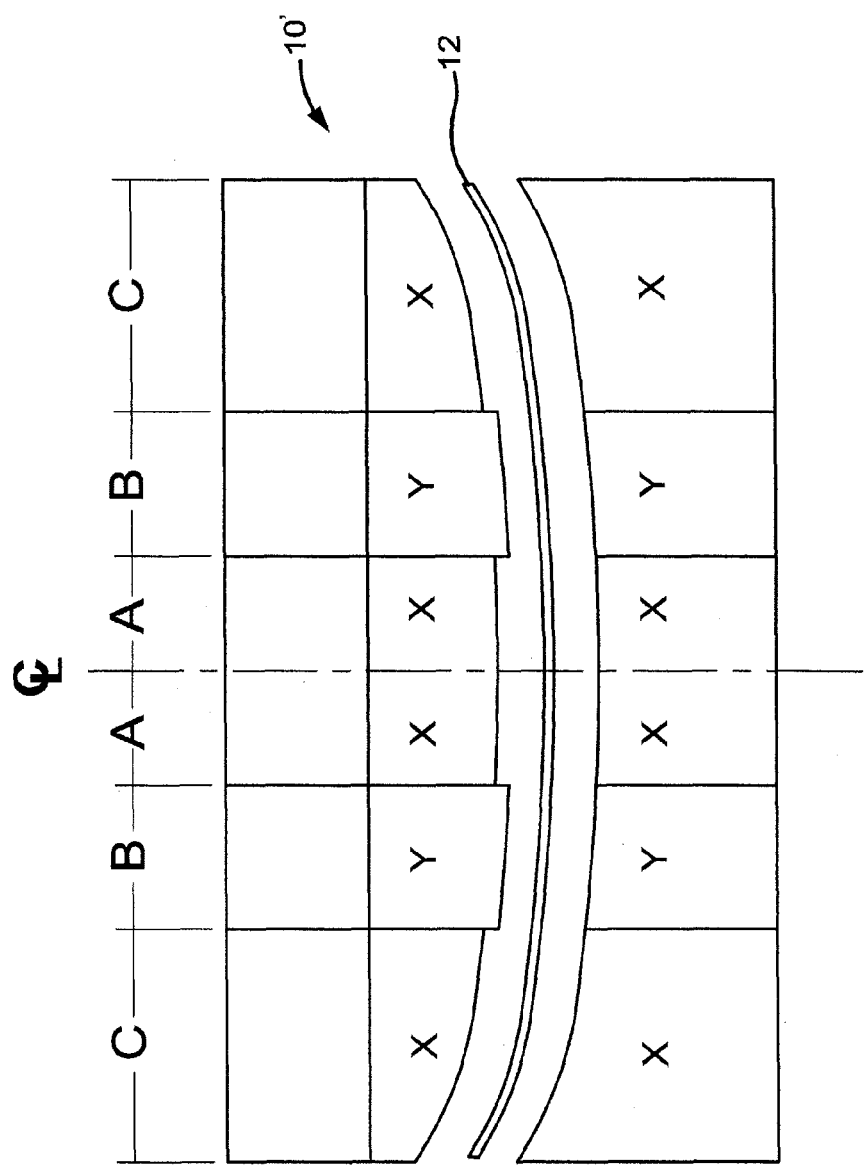
FIG. 5 is a cross-sectional view of first and second complementary tempering assemblies in accordance with the invention.

As shown, for example, in FIG. 5, the distance of the end of the nozzles From the surface of the glass sheet in the parallel rows transverse distance "A" on either side of the centerline of the glass tempering apparatus 10' can be designated as x, and is preferably on the order of 80-90 mm. These nozzles are typically about 6-12 mm, preferably about 6-9 mm, in diameter.

Figure 6:
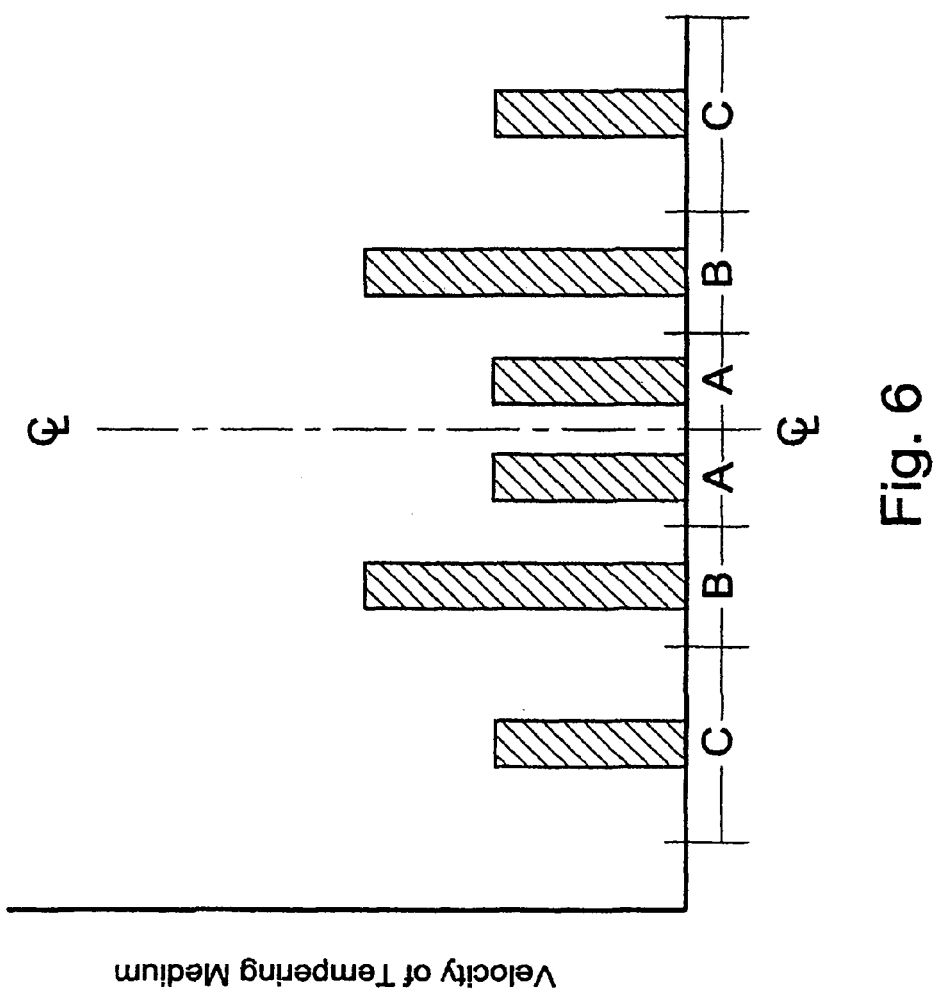
FIG. 6 is a graph/chart of quench air delivered to glass across the width of the blasthead assembly in accordance with a preferred embodiment of the invention.
Figure 7:
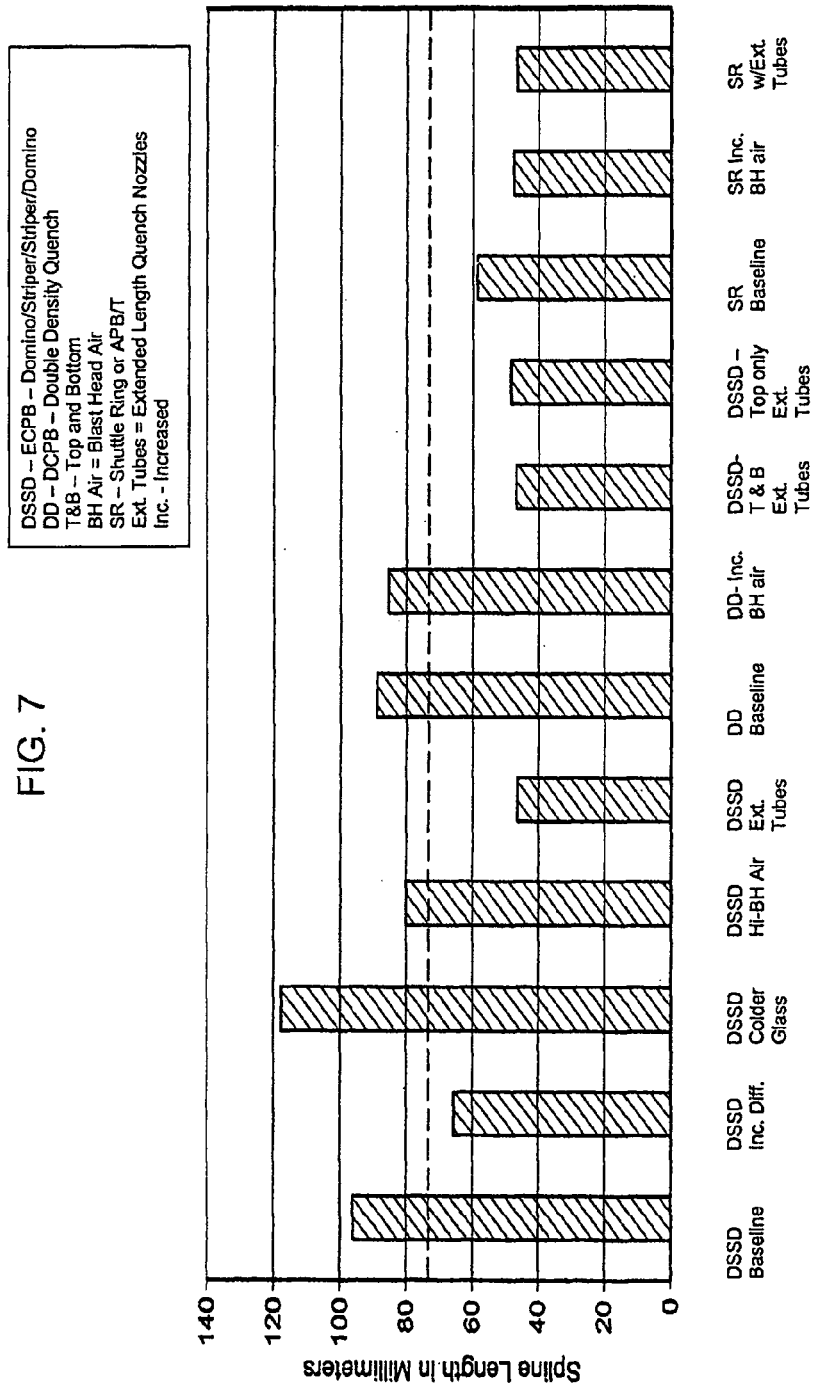
FIG. 7 is a graph/chart comparing the occurrence of splines in a glass sheet utilizing the tempering technology of the present invention, to a conventional tempering apparatus.
Figure 8:
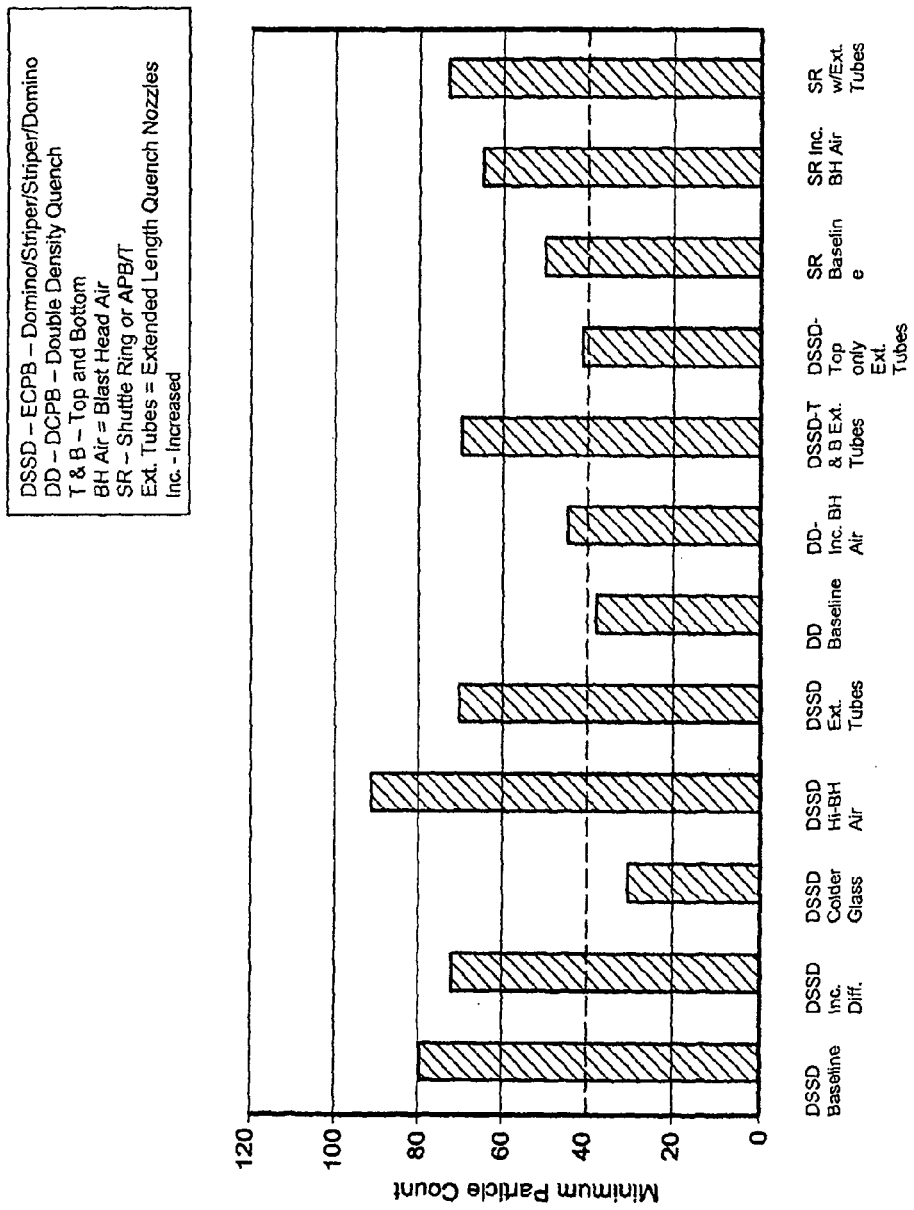
FIG. 8 is a graph/chart comparing the minimum glass particle count which occurs on selective breakage testing of a glass sheet utilizing the tempering technology of the present invention, to a conventional tempering apparatus.

Notably, however, in the area designated by transverse distance "B", the distance of the end of the second plurality of nozzles 18 from the glass can be expressed as y, where y is less than x. Preferably, the nozzle distance from the glass surface is on the order of 60-70 mm. The diameter of the nozzles is typically about 6-12 mm, preferably about 6-9 mm. Thus, the velocity of tempering medium that can be delivered to a selected area of the surface of the glass sheet is substantially increased, preferably to on the order of 15% or more over the velocity delivered by conventional striper modules. A graphical representation of the variation in the velocity of tempering medium delivered in the modified striper module is shown in FIG. 6. The temperature of the tempering medium generally is from 50° F. to 150° F.

Additionally, the heat transfer, away from the glass surface in the transverse distance "B" where the nozzles are y distance from the glass surface, is on the order of 10% or more greater than in areas where the nozzle distance from the glass surface is x.

In the area designated as transverse distance "C" the distance of the end of the nozzles from the substrate surface is x, i.e. on the order of 80-90 mm. These nozzles are typically about 6-12 mm, preferably 6-9 mm, in diameter. In accordance with the invention, in a direction transverse to either side of the centerline of the glass tempering assembly, transverse distances A, B, and C will be dependent on the size and geometry of the glass sheet 12 to be tempered.

The theory of the present invention may be better understood by reference to the following equations:

$$V_f = V_o K \frac{D_o}{D_T} \quad \text{where} \tag{1}$$

$V_f$ = final quench air velocity at the substrate surface
$V_o$ = individual nozzle quench air exit velocity
$K$ = velocity constant for jet flow
$D_o$ = individual nozzle diameter
$D_t$ = distance from end of individual nozzle to substrate surface.

$$h \cong (V)^{0.8} \quad \text{where} \tag{2}$$

$h$ = heat transfer coefficient
$V = V_f$ from equation (1)

EXAMPLES

The benefits of the present invention can be seen by reference to the data presented in Tables 1-4.

Conditions for the Comparative Examples and Examples according to the invention were as follows:

Line speed=240 in/min.
Quench module pressure was between 54" and 47" of water column.
Glass heating furnace temperature was 652° C.-657° C.
Mold closed time=approx. 1 sec.
Distance between tips of upper and lower quench modules=89 mm
Blasthead Air Temperature=104° F., 110° F.
Glass thickness ranged from 3.44-3.47 mm One way of determining the effectiveness of a glass tempering process is by comparison with certain regulatory standards for minimum particle count and maximum spline length when the tempered glass is fractured. For purposes of this application, tempering is deemed to be satisfactory if minimum particle count is greater than 40 particles per 50 mm², while no spline is more than 75 mm in length. By spline is meant a generally elongate glass shard which remains essentially intact after the glass is fractured.

TABLE 1

| Examples | Minimum Particle Count | Longest Spline Length (mm) | Glass Thickness (mm) |
|---|---|---|---|
| 1 | 66 | 118 | 3.47 |
| 2 | 87 | 91 | 3.48 |
| 3 | 69 | 75 | 3.47 |
| 4 | 93 | 103 | 3.47 |
| 5 | 81 | 95 | 3.46 |
| Average | 79.2 | 96.4 | 3.47 |
| Max | 93 | 118 | |
| Min | 66 | 75 | |

Table 1 shows results of fracturing five glass samples tempered utilizing a set of conventional quench modules, that is upper and lower quench modules, having alternating areas of nozzles in domino five and striper patterns, the nozzles conforming to the shape of the glass being tempered. No selectively extended length nozzles were present in either the upper or lower quench nozzles.

As can be seen, utilizing the conventional technology, while minimum particle counts easily exceed the minimum number of 40/50 mm², spline length is, regularly, greater than 75 mm, indicating tempering is, generally, insufficient.

TABLE 2

Quench Modules - Extended Nozzles in Upper and Lower Modules without Differential Heating

| Examples | Minimum Particle Count | Longest Spline Length mm | Glass Thickness (mm) |
|---|---|---|---|
| 6 | 56.5 | 35 | 3.46 |
| 7 | 61.5 | 62 | 3.47 |
| 8 | 78.5 | 36 | 3.46 |
| 9 | 83.5 | 54 | 3.46 |
| 10 | 69 | 44 | 3.46 |
| 11 | 65.5 | 57 | |
| Average | 69.08333 | 48 | 3.46 |
| Max | 83.5 | 62 | |
| Min | 56.5 | 35 | |

TABLE 3

Quench Modules - Extended Nozzles in Upper and Lower Modules without Differential Heating

| Examples | Minimum Particle Count | Longest Spline Length (mm) | Glass Thickness (mm) |
|---|---|---|---|
| 12 | 75 | 46 | 3.46 |
| 13 | 69.5 | 42 | 3.47 |
| 14 | 65 | 43 | 3.45 |
| 15 | 58 | 58 | 3.46 |
| 16 | 72 | 54 | 3.46 |
| 17 | 70.5 | 46 | 3.46 |
| 18 | 65.5 | 46 | 3.47 |
| 19 | 75.5 | 46 | 3.47 |
| 20 | 72.5 | 51 | 3.46 |
| 21 | 78.5 | 46 | 3.47 |
| Average | 70.2 | 47.8 | 3.46 |
| Max | 78.5 | 58 | |
| Min | 58 | | |

Tables 2 and 3 show results of fracturing of a number of glass samples tempered utilizing a set of quench modules having extended length nozzles in selected areas of both upper and lower quench nozzles. Additional heating (differential heating) of the area of the glass substrate affected by the extended quench nozzles was tested in, Examples 6-11. No such differential heating was utilized for Examples 12-21. Differential heating in the areas affected by the extended nozzles appears to somewhat increase the minimum particle counts observed, but did not significantly affect spline length. Minimum particle counts are well above the minimum number of 40/50 mm². Likewise, maximum spline length for Examples 6-21 is well below 75 mm.

TABLE 4

Quench Modules - Extended Nozzles in Upper Module

| Examples | Minimum Particle Count | Longest Spline Length (mm) | Glass Thickness (mm) |
|---|---|---|---|
| 1 | 64.5 | 52 | 3.45 |
| 2 | 64.5 | 55 | 3.46 |
| 3 | 55 | 56 | 3.47 |
| 4 | 69 | 52 | 3.44 |

TABLE 4-continued

Quench Modules - Extended Nozzles in Upper Module

| Examples | Minimum Particle Count | Longest Spline Length (mm) | Glass Thickness (mm) |
|---|---|---|---|
| 5 | 71 | 40 | 3.45 |
| 6 | 62.5 | 39 | 3.46 |
| Average | 64.4 | 49.0 | 3.46 |
| Max | 71 | 56 | |
| Min | 55 | 39 | |

Table 4 shows results of fracturing of a number of glass samples tempered utilizing a set of quench modules having extended nozzles in selected areas of the upper quench module only, according to the invention. Minimum particle counts and maximum spline lengths are as good as, or better than, those where extended nozzles were utilized in both upper and lower quench modules as in Examples 6-21. Thus, it has, surprisingly, been found that extended nozzles in both upper and lower quench nozzles are not necessary to achieve good tempering in areas of large glass sheets where obtaining such results has been difficult with conventional quench modules.

In a preferred configuration, a second tempering apparatus 22, having all nozzles approximately the same distance from the surface of the substrate and a shape substantially conforming to the shape of the glass sheet to be tempered, and complementary to the first glass tempering apparatus is spaced opposite and apart from the first tempering apparatus 10 a distance sufficient for the glass sheet 12 to be tempered to pass therebetween, the second glass tempering apparatus 22 being capable of directing desired volumes of tempering medium at a predetermined velocity toward the second surface of the glass sheet.

Those skilled in the art will appreciate that changes and modifications to the invention are possible in light of the preceding description. It is, therefore, to be understood that within the scope of the appended claims the invention may be practiced otherwise than as specifically described.

What is claimed is:

1. A glass tempering apparatus for a vehicle window having a first glass tempering module comprising, sequentially in a direction parallel to the direction of travel of a shaped glass sheet to be tempered:
    a first zone having a first plurality of nozzles being at a first distance from a first surface of the shaped glass sheet, for directing a tempering medium toward the first surface of the glass sheet at a first predetermined velocity, the nozzles being arranged in a series of staggered rows and configured to conform to the profile of the shaped glass sheet;
    a second zone having a second plurality of nozzles to direct a tempering medium toward the first surface of the shaped glass sheet, the nozzles being arranged in substantially parallel rows, and forming a mirror image from the centerline of the second zone comprising:
        from the centerline to a first transverse distance from the centerline, nozzles substantially at the first distance from the glass surface for directing a tempering medium toward the first glass surface at the first predetermined velocity;
        from the first transverse distance from the centerline to a second transverse distance from the centerline, nozzles at a second distance from the glass sheet, the second distance being less than the first distance, and for directing a tempering medium toward the first surface at a second predetermined velocity, the second predetermined velocity being greater than the first predetermined velocity;
        from the second transverse distance from the centerline to a third transverse distance from the centerline, nozzles substantially at the first distance from the glass surface, for directing a tempering medium toward the first glass surface at substantially the first predetermined velocity; and
    a third zone having a third plurality of nozzles at a distance from the surface of the shaped glass sheet substantially equal to the first distance of the first plurality of nozzles in the first zone from the first surface of the glass sheet in order to direct a tempering medium toward the surface of the glass sheet at a predetermined velocity substantially equal to the first velocity, the nozzles being arranged in a series of staggered rows substantially similar to the arrangement of the first plurality of nozzles;
    the glass tempering apparatus further comprising a second glass tempering module having a shape complementary to the first glass tempering module and spaced opposite and apart therefrom, comprises a first zone having a first plurality of nozzles being a first distance from a second surface of the shaped glass sheet substantially similar to the first distance from the first glass surface of the first glass tempering module, the nozzles being arranged in a pattern substantially similar to the nozzle arrangement of the first glass tempering module; a second zone having a second plurality of nozzles at a distance substantially equal to the first distance from the second surface of the glass sheet of the first plurality of nozzles of the first glass tempering module, and a third zone having a third plurality of nozzles being a distance from the surface of the glass sheet substantially equal to the first distance from the second surface of the glass sheet of the first plurality of nozzles of the first glass tempering module, whereby the first, second and third plurality of nozzles direct the tempering medium toward a second surface of the shaped glass sheet at a predetermined velocity substantially equal to the first predetermined velocity of the first glass tempering module.

2. The glass tempering apparatus defined in claim 1, wherein the distance from the second surface of the glass sheet of the nozzles transversely from the centerline, in the second zone, is x for a distance A, x for a distance B, and x for a distance C.

3. The glass tempering apparatus defined in claim 1, wherein the tempering medium in any one or more of the first, second and third tempering zones is air at a temperature of 50° F. to 150° F.

4. The glass tempering apparatus defined in claim 1, wherein the velocity of the tempering medium directed at the first surface of the glass sheet emitted by the portion of the second plurality of nozzles being at a second lesser distance from the first surface of the glass sheet is at least 15% greater than the velocity of tempering medium at the first surface of the glass sheet as emitted by the first and third pluralities of nozzles being at a greater distance from the first surface of the glass sheet.

5. The first glass tempering apparatus defined in claim 1, wherein the heat transfer at the first surface of the glass sheet in the area contacted by the tempering medium emitted by the portion of the second plurality of nozzles being a second distance from the first surface of the glass sheet is at least 10% greater than the heat transfer of tempering medium at the first surface of the glass sheet in the area contacted by tempering medium emitted by the first and third pluralities of nozzles.

6. The first glass tempering apparatus defined in claim 1, wherein the diameter of each of the nozzles is between 6 and 12 mm.

7. A glass tempering apparatus for a vehicle window having a first glass tempering module comprising, sequentially in a direction parallel to the direction of travel of a shaped glass sheet to be tempered:
- a first zone having a first plurality of nozzles being at a first distance from a first surface of the shaped glass sheet, for directing a tempering medium toward the first surface of the glass sheet at a first predetermined velocity, the nozzles being arranged in a series of staggered rows and configured to conform to the profile of the shaped glass sheet;
- a second zone having a second plurality of nozzles to direct a tempering medium toward the first surface of the shaped glass sheet, the nozzles being arranged in substantially parallel rows, and forming a mirror image from the centerline of the second zone comprising;
  - from the centerline to a first transverse distance from the centerline, nozzles substantially at a first distance from the glass surface for directing a tempering medium toward the first glass surface at the first predetermined velocity;
  - from the first transverse distance from the centerline to a second transverse distance from the centerline, nozzles at a second distance from the glass sheet, the second distance y being less than the first distance, and for directing a tempering medium toward the first surface at a second predetermined velocity, the second predetermined velocity being greater than the first predetermined velocity;
- from the second transverse distance from the centerline to a third transverse distance from the centerline, nozzles at the first distance from the glass surface, for directing a tempering medium toward the first glass surface at substantially the first predetermined velocity; and
- a third zone having a third plurality of nozzles at a distance from the surface of the shaped glass sheet substantially equal to the first distance of the first plurality of nozzles in the first zone from the first surface of the glass sheet in order to direct a tempering medium toward the surface of the glass sheet at a predetermined velocity substantially equal to the first velocity, the nozzles being arranged in a series of staggered rows substantially similar to the arrangement of the first plurality of nozzles;

wherein the first distance of the nozzles from the first surface of the shaped glass sheet in the second zone, transversely from the centerline is x for distance A, the second distance from the first surface of the glass sheet of the nozzles for a distance B is y and the nozzles once again being a first distance from the first surface of the glass sheet x for a distance C, where x is 15-25 mm greater than y.

8. The glass tempering apparatus defined in claim 7, wherein the first distance of the nozzles from the first surface of the shaped glass sheet in the second zone, transversely from the centerline is x for a distance A, the second distance from the first surface of the glass sheet of the nozzles for a distance B is y, and the nozzles once again being a first distance from the first surface of the glass sheet x for a distance C, where x is greater than y.

9. The first glass tempering apparatus defined in claim 7, wherein nozzles distance y from the first surface of the glass sheet are 15-25 mm closer to the first surface of the glass sheet than nozzles being distance x from the first surface of the glass sheet.

* * * * *